Aug. 17, 1954     P. D. BECKER     2,686,547
NUT WITH DEFORMABLE ANCHOR
Filed Jan. 26, 1949                           2 Sheets-Sheet 1
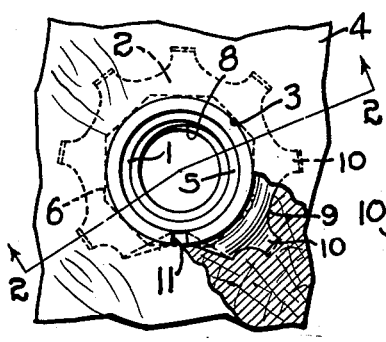
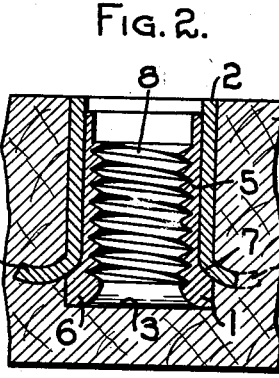
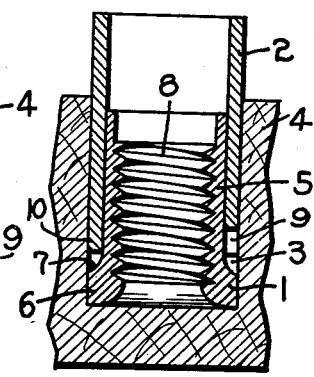
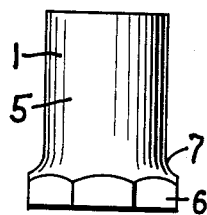
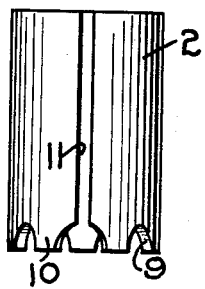
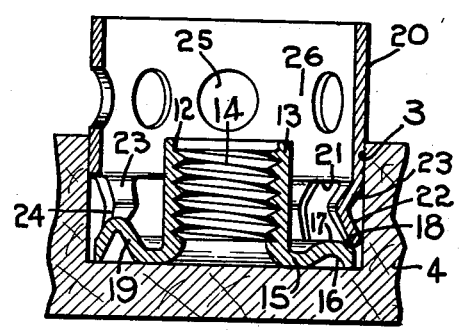
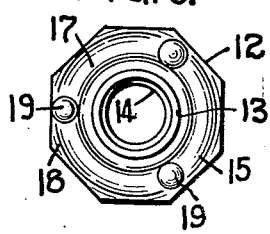
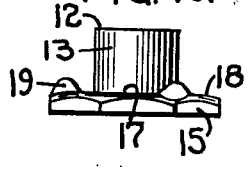
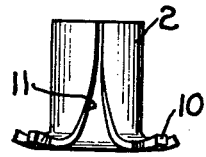
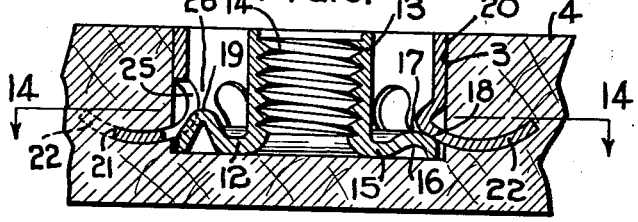
INVENTOR:
PHILIP D. BECKER,
BY John Jodd
ATTORNEY.

Aug. 17, 1954  P. D. BECKER  2,686,547
NUT WITH DEFORMABLE ANCHOR
Filed Jan. 26, 1949  2 Sheets-Sheet 2

INVENTOR:
PHILIP D. BECKER,
By John Todd
ATTORNEY.

Patented Aug. 17, 1954

2,686,547

UNITED STATES PATENT OFFICE 2,686,547

NUT WITH DEFORMABLE ANCHOR

Philip Dix Becker, Hingham, Mass., assignor to United-Carr Fastener Corporation, Cambridge, Mass., a corporation of Massachusetts Application January 26, 1949, Serial No. 72,956

3 Claims. (Cl. 151—41.74)

This invention relates to fastening devices and more particularly to fastening devices of the type adapted to be securely anchored in wood or like material.

It is an object of this invention to provide fastening devices which are simple and economical in construction and which may readily be secured in either hard or soft wood with a minimum of effort and time.

It is a further object of the invention to provide a nut anchor for sheet metal and the like nut members or fastenings which may readily be forced into position by pressure or tapping to securely hold the nut or stud-receiving portion in fixed position in a piece of wood or similar material.

It is a still further object of the invention to provide a holding sleeve for a fastening device of the nut anchor type which in its assembled holding position will form a support for the upper walls of the nut portion of the device thus increasing its resistance to movement or dislodgement by side loadings.

It is another object of the invention to provide an improved fastening device having a split holding sleeve adapted to be forced into holding position more readily and to hold the anchor nut more securely and positively than prior devices of this type.

It is a further object of the invention to provide a holding sleeve for a T-nut anchor device having weakened portions intermediate its ends, said weakened portions being bulged inwardly over the flange of the nut during assembly to form additional clamping and holding means therefor.

Still another object of the invention is to provide an improved fastener device formed of light weight material which may readily be secured in soft wood and the like and tightly fastened therein.

These and other objects and advantages of the invention will become more apparent to persons skilled in the art to which the invention relates by reference to the following description of preferred embodiments of the invention illustrated in the accompanying drawings.

In the drawings:

Fig. 1 is a plan view of the improved fastener device of the present invention applied to hard wood;

Fig. 2 is a cross-sectional view on line 2—2 of Fig. 1;

Fig. 3 is a cross-sectional view similar to Fig. 2 showing the nut and holding sleeve assembled in the wood prior to forcing the sleeve downwardly into holding position;

Fig. 4 is a view in side elevation of the nut;

Fig. 5 is a view in side elevation of the split holding sleeve;

Fig. 6 is an end elevation of the sleeve shown in Fig. 5;

Fig. 7 is a sectional view of a modified form of fastening device particularly adapted for use with soft wood and the like, the parts being shown in position prior to forcing the holding sleeve into holding position;

Fig. 8 is a sectional view similar to Fig. 7 showing the parts in anchored position after the sleeve has been forced downwardly into holding position;

Fig. 9 is a view in end elevation of the nut shown in Figs. 7 and 8;

Fig. 10 is a view in side elevation of the nut shown in Figs. 7, 8 and 9;

Fig. 11 is a view in side elevation of the split sleeve shown in Figs. 2 and 3.

Figure 12:
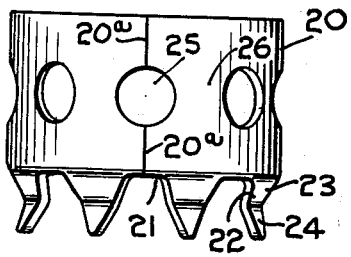
Fig. 12 is a view in side elevation of the sleeve member shown in Figs. 7 and 8.
Figure 13:
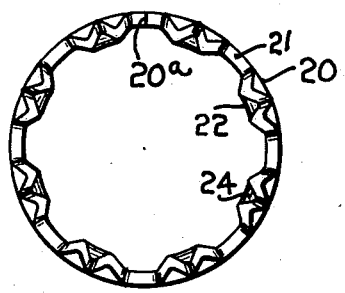
Fig. 13 is a view in end elevation of the sleeve member shown in Fig. 12.
Figure 14:
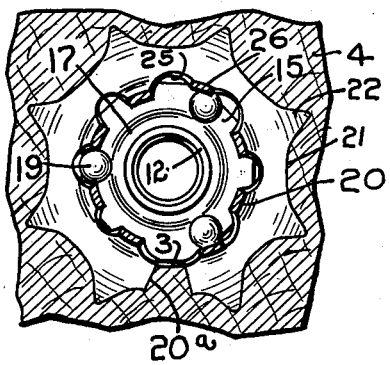
Fig. 14 is a section taken on the line 14—14 of Fig. 8.

The form of fastening device illustrated in Figs. 1 to 6 is particularly adapted for use with hard wood and the like and comprises a nut 1 and holding sleeve 2 securely anchored in an opening 3 of a piece of wood 4. As illustrated, the nut 1 has an upper substantially straight barrel or sleeve section 5 and a lower enlarged base or flanged section 6, the two sections being joined by an arcuate camming portion 7 to facilitate and guide the movement of the holding sleeve projections 10 into holding position. The flanged portion 6 is preferably formed with an octagonal, hexagonal, square or other irregular shape to resist turning movement. The interior of the nut barrel or sleeve is preferably threaded as at 8 to receive a threaded stud, screw or other element to which the fastening device is to be attached.

The sleeve 2 is formed to snugly engage the straight portion 5 of the nut 1 and is provided at its lower end with cut-out work-penetrating prongs or portions 9 to form downwardly projecting portions 10. These cut-outs 9 permit the downwardly projecting portions 10 to be deflected outwardly by the arcuate portions 7 when downward pressure is applied to the sleeve and thus to enter the wood to tightly secure the nut in position as shown in Fig. 2. An important feature of the sleeve construction is that it is split as at 11 (Fig. 5) to further facilitate the spreading out of the downward projections 10 and their entry into the wood.

In assembling the improved locking device of the present invention in operative position in a piece of wood a hole is drilled or otherwise formed in the wood at the desired location, the nut and sleeve positioned therein as shown in Fig. 3, and the sleeve then pressed or hammered into holding and locking position as shown in Fig. 2. The split construction of the sleeve facilitates the spreading out and entry of the projections 10 into the wood as may be seen from Fig. 11, which shows how the sleeve is spread or distorted when in holding position to provide a securely positioned and easily assembled locking device. This enables the prongs 10 and adjoining body portion of the split sleeve 2 to be forced laterally into the wood for a distance substantially greater than the depth of the penetrating prongs, as clearly shown in Figs. 1 and 2, to securely anchor the nut to the workpiece 4. In this form of the device the snug fit of the sleeve within the hole in the wood and around the straight portion of the nut adds rigidity and strength to the whole device and provides support against side loadings.

The form of the invention shown in Figs. 7 to 10 and 12 to 15 is particularly adapted for use in connection with soft wood and the like. In this modification the nut 12 may be provided with a straight barrel or sleeve portion 13 and a threaded opening 14 as before but the lower flange or base portion 15 is considerably wider and is reversely curved as shown by the sectional views in Figs. 7 and 8. This provides a construction in which the upper surface of the flange 15 has an inner annular grooved portion 16, an intermediate annular raised portion 17 and an annular downwardly bevelled outer portion 18. As before, the flanged portion 15 is preferably given an irregular shape such as octagonal, hexagonal, square, and the like to resist turning movement. The wider flange used in this modification of the invention gives the added strength, rigidity, and resistance to turning movement required in the case of the softer wood. The flanged portion 15 has one or more projections 19 on its outer surface which cooperate with openings in the sleeve member 20 to lock the parts in assembly in final holding position as will be described.

The sleeve mmeber 20 is likewise split as at 20ª and is provided at its lower end with cut-out portions 21 forming downwardly extending projections 22 pointed at their ends as shown. The projections 22 are bent inwardly as at 23 and then outwardly as at 24 to facilitate entry into the wood upon the application of pressure. Slightly above the cut-out portions 21 the sleeve 20 is provided with a series of circumferentially spaced openings 25 leaving intervening portions of metal 26. The openings 25 tend to weaken the sleeve thereby effecting a more efficient distortion of its lower pronged end and, at the same time, the openings cooperate with the projections 19 to provide a desirable interlocking of the parts, for a purpose which will be apparent hereinafter.

In assembling the device, as most clearly illustrated in Figs. 7 and 8, an opening 3 is drilled or otherwise formed in a piece of wood 4 and the nut and sleeve assembled therein as shown in Fig. 7. Pressure is then applied to the sleeve as by a press, hammer blows, etc. to force the sleeve into holding position as shown in Fig. 8. During this operation the outwardly curved portions 24 of the projections 22 strike the outer bevelled surface 18 of the flange 15 and are deflected outwardly and into the wood. Also, during this operation the portions 26 of the sleeve 20 between the openings 25 are bent inwardly and over the raised portion of the flange 15 to securely clamp it in position. One or more of the openings 25 will, at the same time, receive a projection 19 of the nut, as shown in Fig. 8, whereby the nut and sleeve are in an interlocked relation which operates to limit effectively rotation of the nut.

The form of invention shown in Figs. 15–18 is also preferably used with soft wood. The nut member 12 of this modification may be the same as the one used with my second form of invention as shown in Fig. 10. Thus, the bevelled outer portion 18 operates in the same manner to deflect the sleeve prongs into the wood. It is understood, however, that the projections 19 may be omitted in the modification of Figs. 15–18 as the sleeve member 27 of this modification does not provide openings for interengagement with the projections in the manner of the sleeve member 20 described above.

Figure 18:
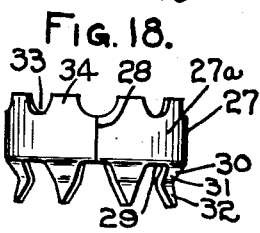
Fig. 18 is a view in side elevation of the holding sleeve.

The sleeve member 27 as shown most clearly in Fig. 18 has a band or body 27ª which is preferably split as at 28. The lower end of the body 27ª has cut-out portions 29 forming projections 30 which are pointed at their ends. The projections 30 are bent inwardly as at 31 and then outwardly as at 32 to effect entrance into the wood when pressure is applied. The upper end of the body 27ª has an annular series of openings 33 which weakens the portions 34 between the openings to permit easy distortion of these portions during the operation by which the sleeve is collapsed into locking, holding position, as will be described.

Figure 15:
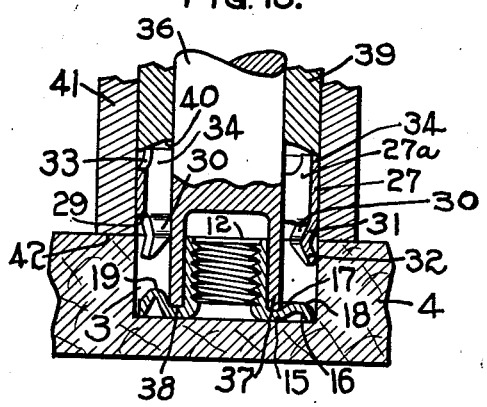
Fig. 15 is a sectional view of a third form of fastening device together with setting tools, the parts being shown in position prior to forcing the holding sleeve into holding position.
Figure 17:
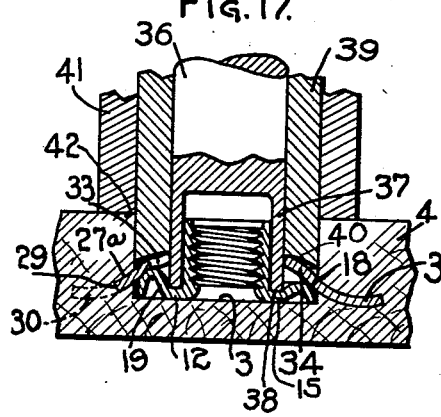
Fig. 17 is a view similar to Figs. 15 and 16 showing the parts in anchored position.
Figure 16:
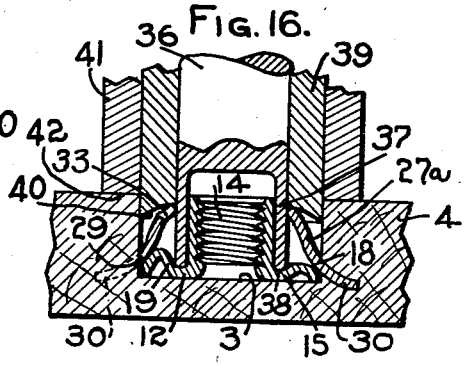
Fig. 16 is a view similar to Fig. 15 showing the relation of the parts intermediate the position of Fig. 15 and anchored position.

In assembling the device as illustrated in Figs. 15–17, an opening 3 is drilled in the wood 4 and the nut member is positioned in the opening. In effecting assemly of the sleeve member 27, a tool device is preferably provided having a mandrel 36 which has an annular sleeve portion 37 of a diameter slightly greater than the nut barrel so as to surround the barrel. The free end 38 of the sleeve portion rests upon the outer surface of the nut base 15 when the mandrel is moved downwardly into operating position whereby the nut member is held in fixed supported position during the operation by which the sleeve member 27 is collapsed into holding position. The mandrel 36 is mounted within a deforming tool 39 which is arranged to slide axially with relation to the mandrel. The tool 39 has a concaved end surface 40 for a purpose to be described. The mandrel and deforming tool are contained within a guide sleeve 41 which rests upon the outer surface of the wood during the attaching operation.

Prior to bringing the tool device down to assemble the sleeve 27 with the nut member, the sleeve is positioned adjacent the concaved end surface 40 of the tool 39 which is in withdrawn position and between the mandrel 36 and the guide sleeve 41. During the attaching operation the tool comes down to position the end of the mandrel over the nut barrel and the end 42 of the guide sleeve abuts the outer surface of the wood. The tool 39 then comes down bringing the sleeve 27. When the projections 30 strike the bevelled surface of the flange 15 they are deflected outwardly into embedded engagement with the wood. As downward movement of the tool 39 continues the surface 40 of the tool forces the portions 34 of the sleeve downwardly and inwardly into substantial abutting engagement with the outer surface of the flange 15 as shown in Fig. 17. Thus, as a result of the construction of the sleeve member 27 and operation of the tool device the diameter of the upper end of the sleeve member is reduced as the diameter of the lower end increases thereby effecting a relatively free distortion of the sleeve member resulting in an efficient holding action.

Although I have illustrated and described preferred embodiments of my invention, I do not wish to be limited thereby as the scope of my invention is best defined in the following claims.

I claim:

1. A nut assembly for anchorage in a bore of a workpiece of wood and the like comprising a sheet metal nut member having an internally threaded barrel and an outwardly extending base flange at one end of substantially greater transverse dimension than said barrel, the upper surface of said base flange provided with a camming surface spaced radially outward from said barrel, and an anchoring member for securing said nut in the workpiece comprising an open ended cylindrical sleeve of a diameter substantially greater than the nut barrel and being longitudinally split from end to end to provide a non-continuous laterally spreadable body portion, a plurality of circumferentially spaced work-penetrating prongs extending longitudinally from and beyond one end of the sleeve body portion and having outwardly turned pointed ends to initially bear on the camming surface of the nut base flange, the body of said sleeve having a circumferential weakened area spaced above said pronged end, said penetrating prongs and adjoining section of the sleeve body portion being laterally spreadable in a direction substantially at right angles to the axis of the sleeve upon application of axial pressure to the opposite end of the sleeve in the direction of said camming portion to cause said prongs and adjoining sleeve body portion to penetrate the work-piece to a distance greater than the depth of the work-penetrating prongs and the weakened area of said sleeve to be displaced inwardly over the camming portion.

2. A nut assembly as defined by claim 1 in which the flange of the nut member is provided with upstanding projections and the circumferential weakened area of the body portion of the sleeve is formed with openings for interlocking connection with said upstanding projections to prevent relative rotation of the parts when in anchored assembly.

3. A nut assembly as defined in claim 1 in which the circumferential weakened area of the body portion of the sleeve above the pronged end is formed with a circumferential series of cutout portions to be displaced inwardly beyond the nut camming surface to overlie the nut base flange when the parts are in anchored assembly.

References Cited in the file of this patent

UNITED STATES PATENTS

| Number | Name | Date |
|---|---|---|
| 477,118 | Hieronymus | June 14, 1892 |
| 1,111,660 | Malaby | Sept. 22, 1914 |
| 1,224,720 | Di Salvo | May 1, 1917 |
| 1,808,318 | Pleister | June 2, 1931 |
| 1,873,894 | Kimbell | Aug. 23, 1932 |
| 2,031,325 | Meyer | Feb. 18, 1936 |
| 2,156,338 | Heyner et al. | May 2, 1939 |
| 2,172,350 | Heyner et al. | Sept. 12, 1939 |
| 2,252,316 | Gelpcke | Aug. 12, 1941 |
| 2,277,956 | Coffman | Mar. 31, 1942 |
| 2,341,598 | Crowley | Feb. 15, 1944 |
| 2,358,783 | Best | Sept. 26, 1944 |
| 2,406,536 | Gelpcke | Aug. 27, 1946 |

FOREIGN PATENTS

| Number | Country | Date |
|---|---|---|
| 576,813 | Great Britain | Apr. 18, 1946 |